United States Patent
Shen et al.

(10) Patent No.: US 12,027,909 B2
(45) Date of Patent: Jul. 2, 2024

(54) POWER CONVERSION SYSTEM AND METHOD OF CONTROLLING THE SAME

(71) Applicant: Delta Electronics (Shanghai) Co., Ltd., Shanghai (CN)

(72) Inventors: Guoqiao Shen, Shanghai (CN); Ning He, Shanghai (CN); Changyong Wang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 29 days.

(21) Appl. No.: 17/457,918

(22) Filed: Dec. 7, 2021

(65) Prior Publication Data
US 2022/0231608 A1    Jul. 21, 2022

(30) Foreign Application Priority Data
Jan. 18, 2021    (CN) .......................... 202110061168.3

(51) Int. Cl.
*H02J 7/34* (2006.01)
*H02J 1/10* (2006.01)
(Continued)

(52) U.S. Cl.
CPC .............. *H02J 7/342* (2020.01); *H02J 1/102* (2013.01); *H02J 2207/20* (2020.01);
(Continued)

(58) Field of Classification Search
CPC ........ H02J 1/10–108; H02J 1/12; H02J 3/381; H02J 7/0019; H02J 7/0024; H02J 7/0063;
(Continued)

(56) References Cited

U.S. PATENT DOCUMENTS

| | | |
|---|---|---|
| 10,199,950 B1 | 2/2019 | Vinciarelli et al. |
| 10,804,798 B1 | 10/2020 | Rizzolatti et al. |

(Continued)

FOREIGN PATENT DOCUMENTS

| | | |
|---|---|---|
| CN | 103797698 B | 10/2017 |
| CN | 109215974 A | 1/2019 |

(Continued)

OTHER PUBLICATIONS

Yunfeng Jiang et al: "Autonomous Demand-Side Current Scheduling of Parallel Buck Regulated Battery Modules", Energies, May 31, 2019, XP055926215 CH ISSN: 1993-1073, DOI: 10.3390/en12112095 ,Retrieved from the Internet : URL: https://www.mdpi.com/1996-1073/12/11/2095/htm>, Retrieved on May 30, 2022.

(Continued)

*Primary Examiner* — Fred E Finch, III
(74) *Attorney, Agent, or Firm* — CKC & Partners Co., LLC (57) ABSTRACT

The application discloses a power conversion system and a controlling method of the same. The power conversion system includes: n choppers, comprising n switching arms connected in parallel, each chopper including: the switching arm, an inductor having a first end connected to a midpoint of the switching arm, and a first capacitor connected in parallel to the switching arm; and n DC components corresponding to the n choppers with a one-to-one relation, wherein one of the DC components is a DC power supply or a DC load, first ends of the DC components are connected together, and a second end of each of the DC components is connected to a second ends of the inductor of the corresponding chopper, where n is a natural number of 2 or more.

27 Claims, 6 Drawing Sheets

(51) Int. Cl.
  *H02M 1/00* (2007.01)
  *H02M 3/158* (2006.01)
(52) U.S. Cl.
  CPC .......... *H02J 2300/24* (2020.01); *H02M 1/007* (2021.05); *H02M 1/0093* (2021.05); *H02M 3/1582* (2013.01)
(58) Field of Classification Search
  CPC .... H02J 7/342; H02J 2207/20; H02J 2300/24; H02J 2300/26; H02M 1/007; H02M 1/0043; H02M 3/10; H02M 3/1582; H02M 3/1584; Y02E 10/50; Y02E 10/56; Y02E 60/10
  See application file for complete search history.

(56) References Cited

U.S. PATENT DOCUMENTS

| | | |
|---|---|---|
| 2010/0213897 A1 | 8/2010 | Tse |
| 2011/0304206 A1 | 12/2011 | Potter et al. |
| 2012/0043923 A1* | 2/2012 | Ikriannikov .......... H02J 7/0014 307/82 |
| 2016/0056667 A1 | 2/2016 | Konishi et al. |
| 2018/0226890 A1* | 8/2018 | Dai ........................ H02J 3/46 |
| 2019/0341776 A1* | 11/2019 | Au ........................ H02S 40/32 |
| 2020/0127568 A1* | 4/2020 | Wilhide ................ H02M 3/158 |
| 2020/0259330 A1* | 8/2020 | Dong .................... H02J 7/0018 |
| 2021/0313877 A1* | 10/2021 | Kim ...................... H02M 3/158 |
| 2022/0200314 A1* | 6/2022 | Zhou .................... H02J 7/0013 |
| 2022/0200480 A1* | 6/2022 | Norisada ............ H02M 7/5387 |

FOREIGN PATENT DOCUMENTS

| | | | |
|---|---|---|---|
| CN | 209402434 U | 9/2019 | |
| CN | 210405122 U | 4/2020 | |
| CN | 108023497 B | 12/2020 | |
| CN | 112208371 A | 1/2021 | |
| JP | 2007166783 A | 6/2007 | |
| JP | 2012165615 A | 8/2012 | |
| JP | 2015144510 A | 8/2015 | |
| JP | 2015195674 A | 11/2015 | |
| TW | 201444263 A | 11/2014 | |
| TW | 201601441 A | 1/2016 | |
| WO | 2017047698 A1 | 3/2017 | |
| WO | WO-2017068814 A1 * | 4/2017 | .............. H02M 1/14 |
| WO | WO-2018107065 A1 * | 6/2018 | ........ H01M 10/4264 |
| WO | 2019102587 A1 | 5/2019 | |

OTHER PUBLICATIONS

Daocheng Huang et al., "Novel non-isolated LLC resonant converters", IEEE, pp. 1373-1380, 2012.

* cited by examiner

POWER CONVERSION SYSTEM AND METHOD OF CONTROLLING THE SAME

CROSS-REFERENCE TO RELATED APPLICATIONS

This non-provisional application claims priority under 35 U.S.C. § 119(a) on Patent Application No. 202110061168.3 filed in P.R. China on Jan. 18, 2021, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The disclosure relates to the field of power conversion, and particularly to a power conversion system and a method of controlling the same.

BACKGROUND

A battery or supercapacitor for high power energy storage is often formed of tens of thousands of low voltage small cells, and high voltages and large currents desired by the system can be obtained after connection those small cells in series and parallel into multiple groups. However, imbalance of series-connected voltages and a circulating current of parallel-connected batteries restrict reliability and usability of the system, and seriously influence investing benefit or system safety. In recent two years, several fire accidents occurred at energy storage stations, reflecting urgent demand of the electric energy storage system for improving protection and safety performance of the system. For sake of safety, many energy storage systems have to limit a rang of SOC (state of charge), such as, from 20% to 80%, during charging and discharging of the batteries, in order to reserve a margin of 10% to 20% for a difference of voltages and a circulating current of the battery packs, causing an increase in cost of investment.

In order to solve the above problems, there are mainly two methods: 1. using bidirectional DC-DC converter (chopper) to achieve bidirectional conversion of voltages and currents of electric energy on both sides by taking each of the battery parks as an input and taking a DC bus of the power supplies or the loads as an output. The bidirectional DC-DC converters have some advantages, including regulating voltage and current, converting input voltage to ouput voltage, and rapid current switching performance, and some disadvantages, such as increasing cost and power loss of high voltage and large current DC conversion elements. 2. using series voltage compensation to regulate DC voltages and currents, and introducing two-port DC-DC converters for voltage compensation in a DC power supply system. These DC-DC converters for voltage compensation have input ports for supplying compensating electric energy, and output ports connected to power circuits of the power supply system for supplying voltage compensation. When compensation voltage is small relative to a power supply voltage, low power DC-DC converters for voltage compensation can be used to regulate a total output voltage and current. Since a power for compensation is largely decreased, as compared to full power input and full power output chopper, volume and cost of the conveters for compensation are reduced, and loss of power conversion is reduced. Such method is also referred to as partial power conversion. The DC-DC converters for compensation are isolated converters including high-frequency transformers, and there is a need to converter power from DC to high-frequency AC, and then to DC, so the number of elements is large, volume is large, and cost is high.

Therefore, it is quite necessary to find a power conversion system and a method of controlling the same, thereby solving one or more technical problems.

SUMMARY

In view of this, one object of the disclosure is to provide a power conversion system, which regulates voltages and/or currents of DC power supplies or loads, and further reduces the number and volume of elements to reduce cost and power loss by using low power non-isolated chopper with a specialized structure.

In order to achieve the object, according to one aspect of the disclosure, a power conversion system is provided, including n choppers, comprising n switching arms connected in parallel, each chopper comprising the switching arm, an inductor having a first end connected to a midpoint of the switching arm and a first capacitor connected in parallel to the switching arm; and n DC components corresponding to the n choppers with a one-to-one relation, wherein one of the n DC components is a DC power supply or a DC load, and first ends of the n DC components are connected together, and a second end of each of the n DC components is connected to a second end of the inductor of the corresponding chopper, where n is a natural number greater than or equal to 2.

According to another aspect of the disclosure, wherein at least one of the n DC components is the DC power supply, and at least one of the n DC components is the DC load.

According to another aspect of the disclosure, wherein the switching arm includes a first switch and a second switch connected in series, and a common connection node of the first switch and the second switch is the midpoint of the switching arm.

According to another aspect of the disclosure, wherein the switching arm includes a third switch, a fourth switch, a fifth switch and a sixth switch connected in series, each of the choppers further includes a flying capacitor electrically coupled between a common connection node of the third switch and the fourth switch and a common connection node of the fifth switch and the sixth switch, and a common connection node of the fourth switch and the fifth switch is the midpoint of the switching arm.

According to another aspect of the disclosure, wherein the DC power supply includes battery, rectifier or supercapacitor.

According to another aspect of the disclosure, wherein the DC power supply further includes a DC-DC converter electrically coupled between the inductor and the battery, the rectifier or the supercapacitor.

According to another aspect of the disclosure, wherein the DC load comprises battery, supercapacitor, resistor, or a DC side of DC/DC converter or DC/AC converter.

According to another aspect of the disclosure, wherein each of the choppers further includes a second capacitor electrically coupled between a first end and/or a second end of the switching arm and the second end of the inductor.

According to another aspect of the disclosure, wherein a voltage of the first capacitor is lower than a voltage of the DC components.

According to another aspect of the disclosure, further including a compensation power supply connected in parallel to the switching arms.

According to another aspect of the disclosure, wherein one of the n DC components is a DC side of an inverter.

According to another aspect of the disclosure, further including a control unit for controlling the n switching arms.

According to another aspect of the disclosure, wherein a voltage at the DC side of the inverter is equal to a weighted mean value of voltages of the remaining (n−1) DC components.

According to another aspect of the disclosure, wherein a weight of the voltage of each of the remaining (n−1) DC components is calculated as a ratio of a current flowing through it to a total current flowing through the remaining (n−1) DC components.

According to another aspect of the disclosure, wherein the remaining (n−1) DC components are battery packs, and the control unit controls currents flowing through the remaining (n−1) DC components.

According to another aspect of the disclosure, wherein a voltage of the first capacitor is less than 50% of a rated voltage of the corresponding battery pack.

According to another aspect of the disclosure, wherein the remaining (n−1) DC components are photovoltaic battery strings.

According to another aspect of the disclosure, wherein when a voltage at the DC side of the inverter is around an average voltage of the maximum power point (MPP) voltage of the (n−1) photovoltaic battery strings, the control unit controls a voltage at the second end of each of the inductors by using the MPP voltage of each of the photovoltaic battery strings as a target value.

According to another aspect of the disclosure, a method of controlling a power conversion system is further provided, including:

providing n choppers, the n choppers comprising n switching arms connected in parallel, each chopper comprising: the switching arm; an inductor having a first end connected to a midpoint of the switching arm; and a first capacitor connected in parallel to the switching arm;

providing n DC components corresponding to the n choppers with a one-to-one relation, wherein one of the n DC components is a DC power supply or a DC load, first ends of the n DC components are connected together, and a second end of each of the n DC components is connected to a second end of the inductor of the corresponding chopper, where n is a natural number greater than or equal to 2; and regulating currents through the n DC components or voltages across the n DC components by controlling the n switching arms.

According to another aspect of the disclosure, wherein one of the n DC components is a DC side of an inverter.

According to another aspect of the disclosure, wherein a voltage at the DC side of the inverter is controlled to be equal to a weighted mean value of the voltages of the remaining (n−1) DC components.

According to another aspect of the disclosure, wherein a weight of the voltage of each of the remaining (n−1) DC components is calculated as a ratio of a current flowing through it to a total current flowing through the remaining (n−1) DC components.

According to another aspect of the disclosure, wherein the remaining (n−1) DC components are battery packs.

According to another aspect of the disclosure, wherein a voltage of the first capacitor is controlled to be a fixed value.

According to another aspect of the disclosure, wherein the fixed value is lower than a voltage of the battery packs and a voltage at the DC side of the inverter.

According to another aspect of the disclosure, wherein the fixed value is less than 50% of a rated voltage of the battery packs.

According to another aspect of the disclosure, wherein the remaining (n−1) DC components are photovoltaic battery strings.

According to another aspect of the disclosure, wherein a voltage at the DC side of the inverter is controlled to be around an average voltage of the MPP voltage of the (n−1) photovoltaic battery strings, and a voltage at the second end of each of the inductors is controlled by taking the MPP voltage of each of the photovoltaic battery strings as a target value.

The power conversion system of the disclosure replaces a large power converter with n choppers as low power non-isolated converters, to achieve current regulation and circulating current suppression of DC components such as the battery packs or supercapacitors. The disclosure can be applied to the energy storage system with multiple battery packs connected in parallel, achieves circulating current suppression/current regulation/SOC optimization and maintenance at low cost, and improves service life and safety of the batteries. The service life of the batteries is improved by about 15%.

Hereinafter explanations are described in details with reference to the embodiments, and further interpretations are provided to the technical solution of the disclosure.

BRIEF DESCRIPTION OF THE DRAWINGS

To make the above and other objects, features, advantages and examples of the disclosure more apparent, the accompanying drawings are explained as follows.

DETAILED DESCRIPTION

To make description of the disclosure more specific and complete, the accompanying drawings and various examples can be referred, and the same numbers in the drawings represent the same or similar components. On the other hand, the commonly known components and steps are not described in the examples to avoid unnecessary limit to the disclosure. In addition, for sake of simplifying the drawings, some known common structures and elements are illustrated in the drawings in a simple manner.

Figure 1:
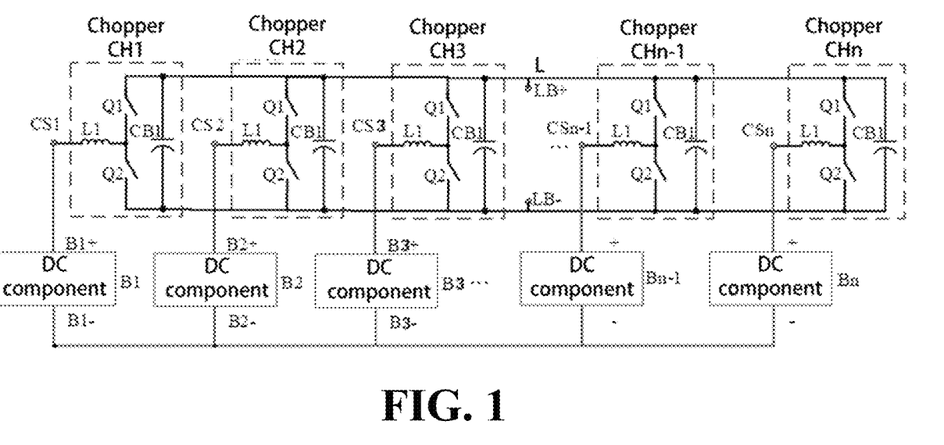
FIG. 1 is a circuit diagram of a power conversion system according to a first embodiment of the disclosure.

According to one embodiment of the disclosure, referring to FIG. 1, a power conversion system is provided, including n choppers CH1-CHn and n DC components B1-Bn, where n is a natural number greater than or equal to 2. The n choppers CH1-CHn includes n switching arms connected in parallel. Each chopper includes: the switching arm, an inductor L1 having a first end connected to a midpoint of the switching arm, and a first capacitor CB1 connected in parallel to the switching arm. Further, each switching arm includes a first switch Q1 and a second switch Q2 connected in parallel. The inductor L1 has a first end connected to a midpoint of the switching arm, i.e., a common connection node of the first switch Q1 and the second switch Q2. The first capacitor CB1 is connected in parallel to the switching arm. The n DC components B1-Bn correspond to the n choppers CH1-CHn with a one-to-one relation, and the DC component is a DC power supply or a DC load. First ends of the n DC components are connected together, and a second end of each the n DC components is connected to a second end of the inductor L1 of the corresponding chopper. At least one of the n DC components B1-Bn is a DC power supply, and at least one of the n DC components B1-Bn is a DC load. In some embodiments, the choppers work unidirectionally. In some embodiments, the choppers work bidirectionally. In some embodiments, a part of the choppers work unidirectionally, and a part of the choppers work bidirectionally. Further, each switching arm is connected in parallel between two ends LB+ and LB− of a local DC bus L. There is no direct connection between the DC components B1-Bn and the first capacitor CB1, i.e., the local DC bus L.

Specifically, the DC power supply includes battery, rectifier or supercapacitor. The DC power supply may further include DC-DC converter electrically coupled between the inductors L1 and the battery, or electrically coupled between the inductors L1 and the rectifier, or electrically coupled between the inductors L1 and the supercapacitor.

Further, the DC load include battery, supercapacitor, resistor, or DC side of DC/DC converter or DC/AC converter.

Figure 2:
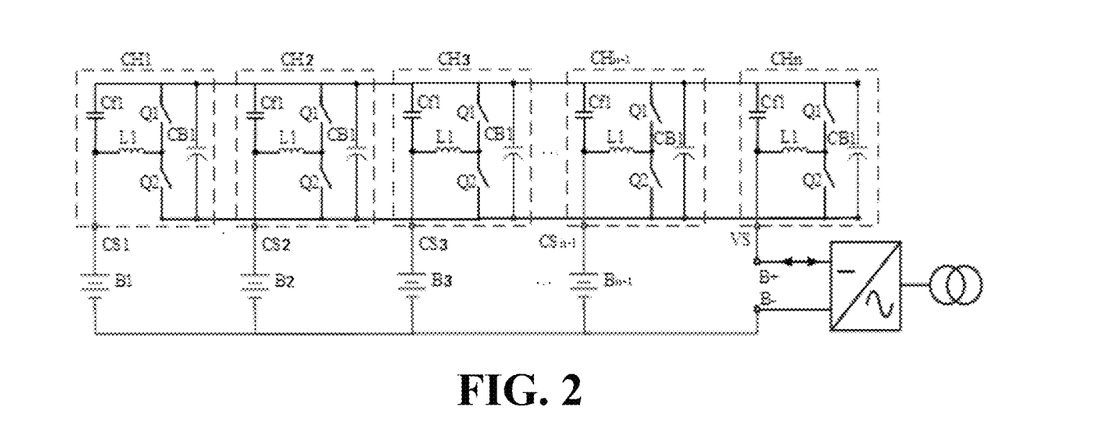
FIG. 2 is a circuit diagram of a power conversion system having multiple types of DC power supplies or DC loads according to a second embodiment of the disclosure.
Figure 3:
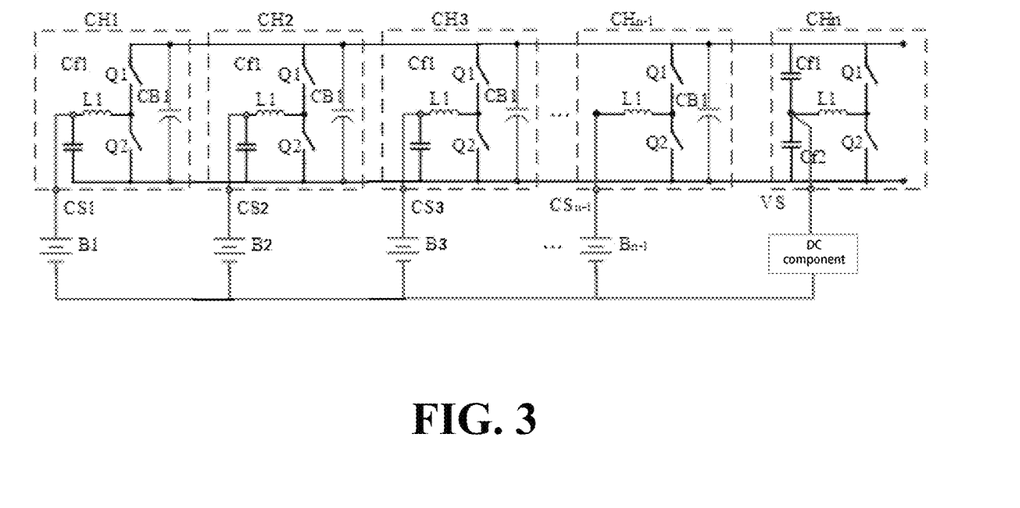
FIG. 3 is a circuit diagram of a power conversion system configured with filter capacitors at different positions according to a third embodiment of the disclosure.

Referring to FIGS. 2-3, each of the choppers further includes a second capacitor electrically coupled between a first end or a second end of the switching arm and the second end of the inductor L1. Further, the second capacitor Cf1 is coupled between the first end of the switching arm and the second end of the inductor L1, and the second capacitor Cf2 is electrically coupled between the second end of the switching arm and the second end of the inductor L1.

Further, the rated working voltages of the first switch Q1 and the second switch Q2 are lower than a voltage of the DC components, and a voltage of the first capacitor CB1 is lower than the voltage of the DC components.

Figure 4:
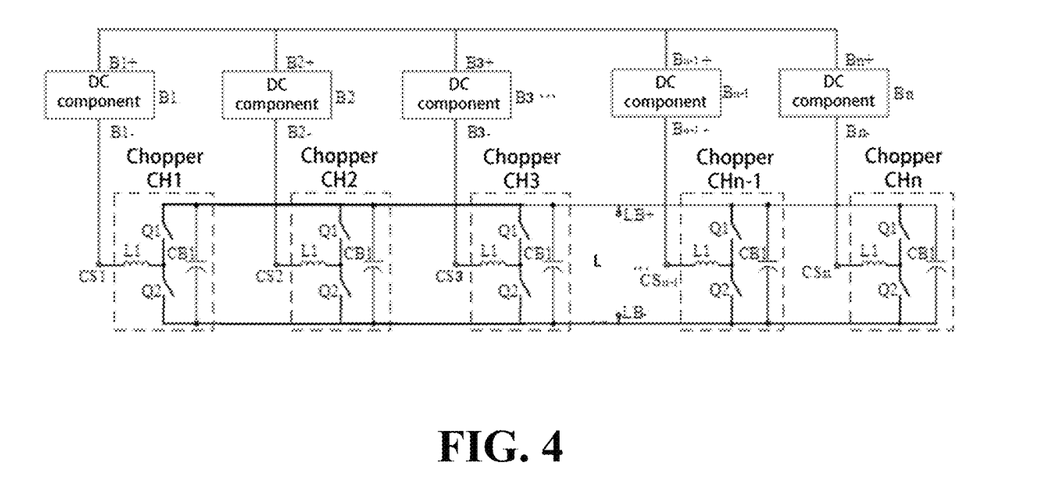
FIG. 4 is a circuit diagram of a power conversion system according to a fourth embodiment of the disclosure, in which inductors of choppers are connected to negative electrodes of DC power supplies or loads, and positive electrodes of the power supplies or loads are connected together in parallel.

Referring to FIG. 4, the inductors L1 of the choppers are connected to negative electrodes Bn− of the DC components, and positive electrodes Bn+ of the DC components are connected together in parallel. Alternatively, referring to FIGS. 1-3, the inductors L1 of the choppers are connected to positive electrodes Bn+ of the DC components, and negative electrodes Bn− of the DC components are connected together.

Figure 5:
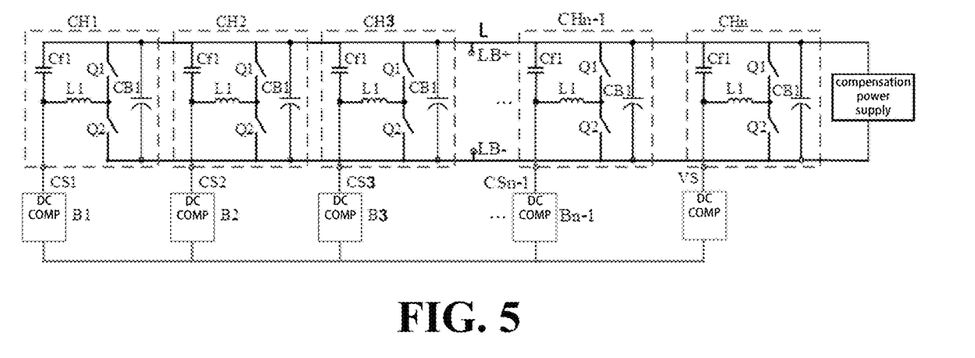
FIG. 5 is a circuit diagram of a power conversion system according to a fifth embodiment of the disclosure, in which a local DC bus is connected to a compensation power supply.

According to another embodiment of the disclosure, referring to FIG. 5, the power conversion system further includes a compensation power supply connected in parallel to the switching arm. Specifically, the compensation power supply is connected to the local DC bus L.

Figure 6:
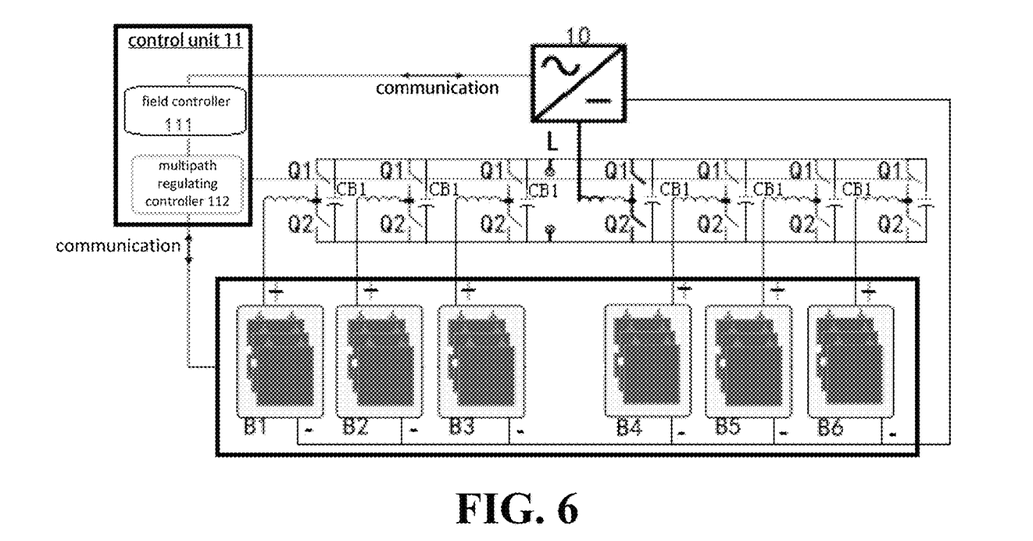
FIG. 6 is a circuit diagram of a power conversion system according to a sixth embodiment of the disclosure.

According to another embodiment of the disclosure, referring to FIG. 6, one of the n DC components B1-Bn is a DC side of an inverter 10, and the remaining (n−1) DC components are battery packs B1-Bn-1. FIG. 6 illustrates a case in which n=7. In some embodiments, the inverter 10 transmits power unidirectionally. In some embodiments, the inverter 10 may transmit power bidirectionally. In some embodiments, the inverter 10 is a power conditioning system (PCS). The power conversion system further includes a control unit 11 for controlling the first switch Q1 and the second switch Q2. The control unit 11 includes a multipath regulating controller 112 and a field controller 111. The multipath regulating controller 112 is in communication with the remaining (n−1) DC components, except the DC side of the inverter 10, and is electrically connected to the first switch Q1 and the second switch Q2 of each chopper. The multipath regulating controller 112 is connected to the inverter 10 through the field controller 111. Further, a voltage at the DC side of the inverter 10 is equal to a weighted mean value of a voltage of the remaining (n−1) DC components. It can be understood that a weight of the voltage of each of the remaining (n−1) DC components is calculated as a ratio of a current flowing through the DC component to a total current flowing through the remaining (n−1) DC components.

In some embodiments, the remaining (n−1) DC components are battery packs, and the control unit 11 controls currents flowing through the remaining (n−1) DC components.

Specifically, referring to FIG. 6, a plurality of battery packs in the battery energy storage system are connected in parallel, and their rated voltages are the same. With respect to a difference in for example SOC (state of charge)/SOH (state of health), the control unit 11 regulates charging and discharging currents of the battery packs. Specifically, as shown in FIG. 6, n=7, where 6 choppers are connected to the battery packs B1-B7, respectively, and the 7$^{th}$ chopper is connected to the DC side of the inverter 10. A voltage of the local DC bus L is far less than a voltage of the battery packs B1-B7 or a voltage at the DC side of the inverter 10. The multipath regulating controller 112 controls currents of the respective batteries depending on SOC and SOH of the respective battery packs, the 7$^{th}$ chopper controls the voltage at the DC side of the inverter 10, and the voltage at the DC side of the inverter 10 is equal to a weighted mean value of voltages of all battery packs. Since a difference between the voltage of the battery packs B1-B7 and the voltage at the DC side of the inverter 10 is small, the voltage of the local DC bus L is low, so an extremely high efficiency of the system is obtained. For example, for battery packs with a rated voltage of 1000V, a voltage difference of 8% exists between the unscreened groups, i.e., the maximum voltage 80V, and the voltage of the local DC bus L can be controlled from 100V to 120V, which is far less than the rated voltage of the battery pack.

In some embodiments, the voltage of the local DC bus L, i.e., the voltage of the first capacitor CB1, is controlled to be a fixed value, and the fixed voltage is lower than a voltage of the battery packs and a voltage at the DC side of the inverter. In some embodiments, the fixed value is less than 50% of a rated voltage of the battery packs.

Figure 7:
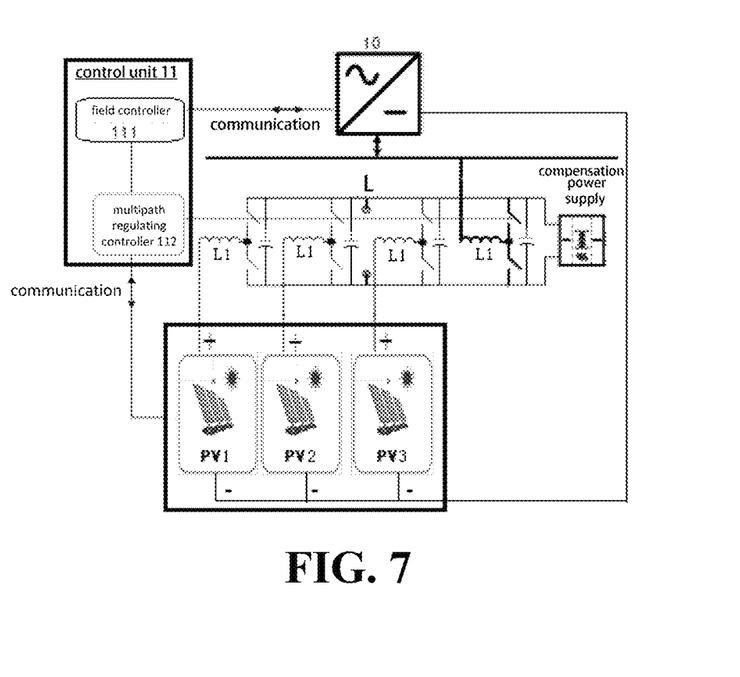
FIG. 7 is a circuit diagram of a power conversion system according to a seventh embodiment of the disclosure.

According to another embodiment of the disclosure, referring to FIG. 7, one of the n DC components B1-Bn is a DC side of an inverter 10, and the remaining (n−1) DC components are photovoltaic battery strings PV1, PV2 and PV3, as shown in FIG. 7. Further, when a voltage at the DC side of the inverter 10 is around an average voltage of the maximum power point (MPP) voltage of the (n−1) photovoltaic battery strings, for example, within a range of 85% to 115% of the average voltage, the control unit controls a voltage at the second end of each of the inductors L1 by taking the MPP voltage of each of the photovoltaic battery strings as a target value.

Specifically, in a distributed PV power generation system, the inverter 10 controls the voltage at the DC side of the inverter to be around an average value of the MPP voltage of the multipath photovoltaic battery strings, for example, about 82% of an open-circuit voltage of the photovoltaic battery strings, and each of the choppers regulate a difference between the voltage at the second end of the inductor L1 and the voltage at the DC side of the inverter 10, such that a voltage of each photovoltaic battery string can reach the MPP working point.

Referring to FIG. 7, n=4, where three choppers are connected to the photovoltaic battery strings B1, B2 and B3, respectively, and the 4$^{th}$ chopper is connected to the DC side of the inverter 10. A voltage across the switching arm is far less than the voltage of the photovoltaic battery strings B1, B2 and B3 or the voltage at the DC side of the inverter 10, and the inverter 10 controls the voltage at the DC side of the inverter to be about 0.82 of an open-circuit voltage of the photovoltaic battery strings. The multipath regulating controller 112 regulates a difference between the voltage at the second end of the inductor L1 of each chopper and the voltage at the DC side of the inverter 10, such that the voltage of the photovoltaic battery strings tracks the MPP. Since a difference between the MPP voltage of the photovoltaic battery strings B1, B2 and B3 and the voltage at the DC side of the inverter 10 is small, the voltage of the local DC bus L is low, so an extremely high efficiency of the system is obtained. For example, the voltage of the local DC bus is controlled to be 50% of a working voltage of the DC power supply or load, and as compared to full voltage choppers, switching devices fit to dc bus voltage can be used, and loss of the choppers is reduced in the case of the same current. Moreover, the total power from the choppers compensated into photovoltaic cell string B1, B2, and B3, can be supplied through one compensation power supply, for example the isolated bidirectional or unidirectional DC-DC converter.

Figure 8:
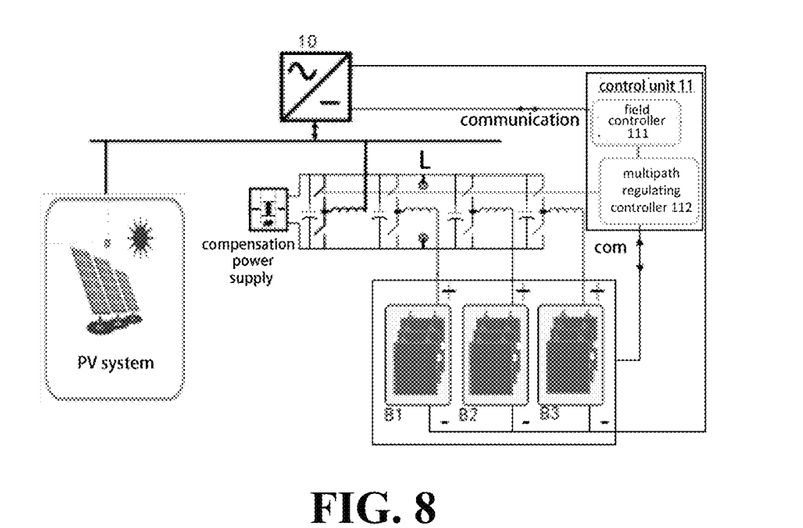
FIG. 8 is a circuit diagram of a power conversion system according to an eighth embodiment of the disclosure.

Further, referring to FIG. 8, in some battery energy storage systems, there is small difference between a voltage range of the battery packs and a voltage range of the DC side of the inverter 10. By using multipath choppers and the additional compensation power supply, charging and discharging currents of each group of batteries can be regulated through the local DC bus L with a low voltage. Specifically, in a case that n=4, where three choppers are connected to the battery packs B1, B2 and B3, respectively, and the 4$^{th}$ chopper is connected to the DC side of the inverter 10. Assuming that the voltage at the DC side of the inverter 10 is slightly higher than the voltage of the battery packs B1, B2 and B3, a difference between the voltage at the DC side of the inverter 10 and the voltage of the battery packs B1, B2 and B3 is far less than the voltage of the battery packs B1, B2 and B3, so the voltage of the local DC bus L can be set to be slightly higher than the voltage difference. The control unit regulates currents of the inductors L1 of the respective choppers, such that the charging and discharging currents of the battery packs B1, B2 and B3 conform to management requirements of the SOC and SOH. Since the voltage of the local DC bus L is low, an extremely high efficiency of the system is obtained. For example, the voltage at the DC side of the inverter 10 is controlled to be 1000V, the voltage range of the battery packs B1, B2 and B3 is from 720V to 920V, and the voltage of the local DC bus L is controlled to be 350V, satisfying the requirement for improvement of the voltage of the battery packs B1, B2 and B3 when the minimum voltage is 700V and the maximum voltage is 920V. The total power from the choppers compensated into photovoltaic cell string B1, B2, and B3, can be supplied through one compensation power supply, for example the isolated bidirectional or unidirectional DC-DC converter.

Figure 9:
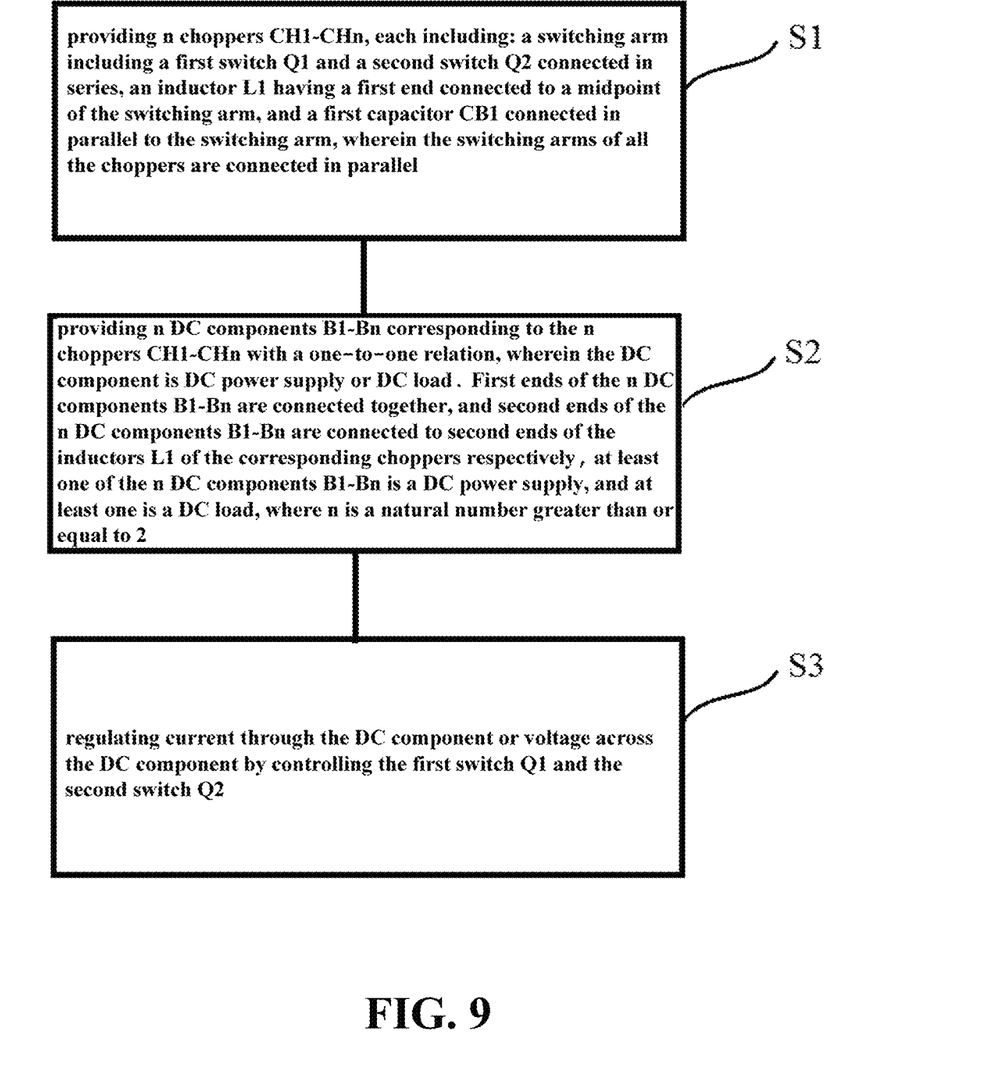
FIG. 9 is a flow chart of a method of controlling a power conversion system according to one embodiment of the disclosure.

According to another aspect of the disclosure, a method of controlling a power conversion system is further improved. Please refer to FIGS. 1 and 9, the control method includes:

In step S1, providing n choppers CH1-CHn, each including: a switching arm including a first switch Q1 and a second switch Q2 connected in series, an inductor L1 having a first end connected to a midpoint of the switching arm, and a first capacitor CB1 connected in parallel to the switching arm, wherein the switching arms of all the choppers are connected in parallel.

In step S2, providing n DC components B1-Bn corresponding to the n choppers CH1-CHn with a one-to-one relation, wherein the DC component is DC power supply or DC load. First ends of the n DC components B1-Bn are connected together, and second ends of the n DC components B1-Bn are connected to second ends of the inductors L1 of the corresponding choppers respectively, at least one of the n DC components B1-Bn is a DC power supply, and at least one is a DC load, where n is a natural number greater than or equal to 2.

In step S3, regulating current through the DC component or voltage across the DC component by controlling the first switch Q1 and the second switch Q2.

In some embodiments, the first switch Q1 and the second switch Q2 are controlled to work in a complementary conduction manner.

Figure 10:
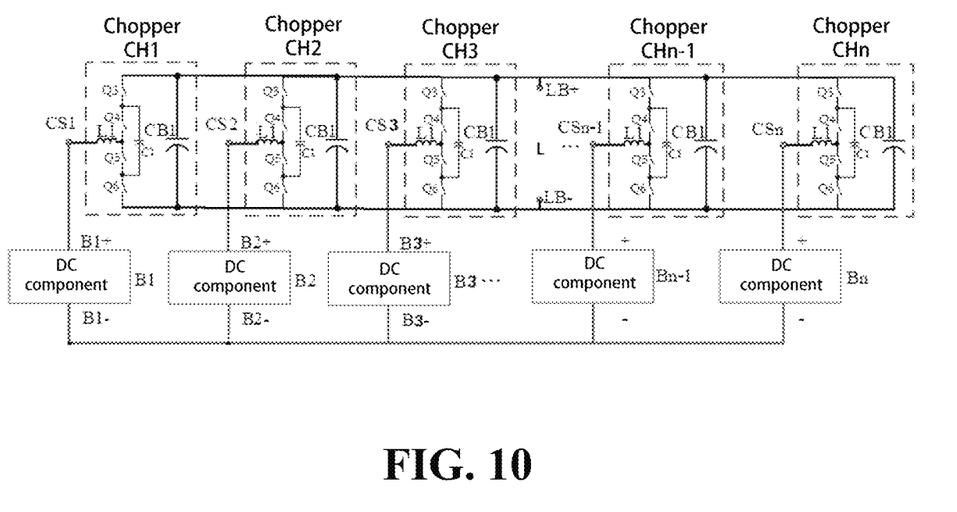
FIG. 10 is a circuit diagram of a power conversion system according to a ninth embodiment of the disclosure.

The choppers in the above embodiments all use a half-bridge structure. In this embodiment, in order to satisfy the requirement for a high voltage, the choppers can use a three-level structure. As shown in FIG. 10, a difference between this embodiment and FIG. 1 lies in that each switching arm includes a third switch Q3, a fourth switch Q4, a fifth switch Q5 and a sixth switch Q6 connected in series. The midpoint of the switching arm, i.e., a common connection node of the fourth switch Q4 and the fifth switch Q5, is connected to the first end of the inductor L1. Each chopper further includes a flying capacitor C1 electrically coupled between a common connection node of the third switch Q3 and the fourth switch Q4 and a common connection node of the fifth switch Q5 and the sixth switch Q6. Various deformations of the DC components and the control method of the switching arm in this embodiment using the half-bridge structure are applicable to the embodiment using the three-level structure.

The disclosure replaces a large power converter with low power non-isolated converters (n choppers), to achieve current regulation and circulating current suppression of the DC components. The disclosure can be applied to the energy storage system with multiple battery packs connected in parallel, achieves circulating current suppression/current regulation/SOC optimization and maintenance at low cost, and improves service life and safety of the batteries. The service life of the batteries is improved by about 15%.

Although the disclosure has been disclosed in the embodiments, the disclosure is not limited thereto. Any skilled in the art shall make various variations and modifications without departing from spirit and scope of the disclosure, so the protection scope of the disclosure shall be subjected to the scope defined by the appended claims.

What is claimed is:

1. A power conversion system, comprising:
   n choppers, comprising n switching arms connected in parallel, each chopper comprising:
   the switching arm;
   an inductor having a first end connected to a midpoint of the switching arm; and
   a first capacitor connected in parallel to the switching arm; and
   n DC components corresponding to the n choppers with a one-to-one relation, wherein at least one of the n DC components is a DC power supply, and at least one of the n DC components is a DC load, and first ends of the n DC components are connected together and are not directly electrically connected to the switching arm of each chopper, and a second end of each of the n DC components is connected to a second end of the inductor of the corresponding chopper, where n is a natural number greater than or equal to 2.

2. The power conversion system according to claim 1, wherein each of the n switching arms comprises a first switch and a second switch connected in series, and a common connection node of the first switch and the second switch is the midpoint of the corresponding switching arm.

3. The power conversion system according to claim 1, wherein each of the n switching arms comprises a third switch, a fourth switch, a fifth switch and a sixth switch connected in series, each of the choppers further comprises a flying capacitor electrically coupled between a common connection node of the third switch and the fourth switch and a common connection node of the fifth switch and the sixth switch, and a common connection node of the fourth switch and the fifth switch is the midpoint of the corresponding switching arm.

4. The power conversion system according to claim 1, wherein the DC power supply comprises battery, rectifier or supercapacitor.

5. The power conversion system according to claim 4, wherein the DC power supply further comprises a DC-DC converter electrically coupled between the corresponding inductor and the corresponding battery, the corresponding rectifier or the corresponding supercapacitor.

6. The power conversion system according to claim 1, wherein the DC load comprises battery, supercapacitor, resistor, or a DC side of DC/DC converter or DC/AC converter.

7. The power conversion system according to claim 1, wherein each of the n choppers further comprises a second capacitor electrically coupled between a first end or a second end of the switching arm and the second end of the inductor.

8. The power conversion system according to claim 1, wherein a voltage of the first capacitor is lower than a voltage of the DC components.

9. The power conversion system according to claim 1, further comprising a compensation power supply connected in parallel to the switching arm.

10. The power conversion system according to claim 1, wherein one of the n DC components is a DC side of an inverter.

11. The power conversion system according to claim 10, further comprising a control unit for controlling the n switching arms.

12. The power conversion system according to claim 11, wherein the remaining (n−1) DC components are battery packs, and the control unit controls currents flowing through the remaining (n−1) DC components.

13. The power conversion system according to claim 12, wherein a voltage of the first capacitor is less than 50% of a rated voltage of the corresponding battery pack.

14. The power conversion system according to claim 11, wherein the remaining (n−1) DC components are photovoltaic battery strings.

15. The power conversion system according to claim 14, wherein when a voltage at the DC side of the inverter is around an average voltage of the maximum power point (MPP) voltage of the (n−1) photovoltaic battery strings, the control unit controls a voltage at the second end of each of the inductors by using the MPP voltage of each of the photovoltaic battery strings as a target value.

16. The power conversion system according to claim 10, wherein a voltage at the DC side of the inverter is equal to a weighted mean value of voltages of the remaining (n−1) DC components.

17. The power conversion system according to claim 16, wherein a weight of the voltage of each of the remaining (n−1) DC components is calculated as a ratio of a current flowing through it to a total current flowing through the remaining (n−1) DC components.

18. A method of controlling a power conversion system, comprising:
   providing n choppers, the n choppers comprising n switching arms connected in parallel, each chopper comprising: the switching arm; an inductor having a first end connected to a midpoint of the switching arm; and a first capacitor connected in parallel to the switching arm;
   providing n DC components corresponding to the n choppers with a one-to-one relation, wherein at least one of the n DC components is the DC power supply, and at least one of the n DC components is the DC load, first ends of the n DC components are connected together and are not directly connected electrically to the switching arm of each chopper, and a second end of each of the n DC components is connected to a second end of the inductor of the corresponding chopper, where n is a natural number greater than or equal to 2; and
   regulating currents through the n DC components or voltages across the n DC components by controlling the n switching arms.

19. The control method according to claim 18, wherein one of the n DC components is a DC side of an inverter.

20. The control method according to claim 19, wherein a voltage at the DC side of the inverter is controlled to be equal to a weighted mean value of the voltages of the remaining (n−1) DC components.

21. The control method according to claim 20, wherein a weight of the voltage of each of the remaining (n−1) DC components is calculated as a ratio of a current flowing through it to a total current flowing through the remaining (n−1) DC components.

22. The control method according to claim 19, wherein the remaining (n−1) DC components are battery packs.

23. The control method according to claim 22, wherein a voltage of the first capacitor is controlled to be a fixed value.

24. The control method according to claim 23, wherein the fixed value is lower than a voltage of the battery packs and a voltage at the DC side of the inverter.

25. The control method according to claim 24, wherein the fixed value is less than 50% of a rated voltage of the battery packs.

26. The control method according to claim 19, wherein the remaining (n−1) DC components are photovoltaic battery strings.

27. The control method according to claim 26, wherein a voltage at the DC side of the inverter is controlled to be around an average voltage of the MPP voltage of the (n−1) photovoltaic battery strings, and a voltage at the second end of each of the inductors is controlled by taking the MPP voltage of each of the photovoltaic battery strings as a target value.

* * * * *